United States Patent  (10) Patent No.: US 10,490,321 B2
Nagaishi et al.  (45) Date of Patent: Nov. 26, 2019

(54) SUPERCONDUCTING WIRE AND SUPERCONDUCTING COIL

(71) Applicant: Sumitomo Electric Industries, Ltd., Osaka-shi, Osaka (JP)

(72) Inventors: Tatsuoki Nagaishi, Osaka (JP); Takashi Yamaguchi, Osaka (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 0 days.

(21) Appl. No.: 16/344,927

(22) PCT Filed: Oct. 31, 2016

(86) PCT No.: PCT/JP2016/082333
§ 371 (c)(1),
(2) Date: Apr. 25, 2019

(87) PCT Pub. No.: WO2018/078876
PCT Pub. Date: May 3, 2018

(65) Prior Publication Data
US 2019/0259512 A1  Aug. 22, 2019

(51) Int. Cl.
*H01B 12/06* (2006.01)
*H01F 6/04* (2006.01)
*H01B 12/16* (2006.01)
*H01F 6/06* (2006.01)

(52) U.S. Cl.
CPC ............ *H01B 12/06* (2013.01); *H01B 12/16* (2013.01); *H01F 6/04* (2013.01); *H01F 6/06* (2013.01)

(58) Field of Classification Search
CPC  H01B 12/06; H01B 12/16; H01F 6/06; H01F 6/04
USPC ..................................................... 174/125.1
See application file for complete search history.

(56) References Cited

U.S. PATENT DOCUMENTS

2014/0357495 A1* 12/2014 Daibo .................. H01F 6/06
505/211
2015/0024942 A1*  1/2015 Hayase ................ H01L 39/143
505/230
2016/0247608 A1*  8/2016 Choi .................... H01L 39/143

FOREIGN PATENT DOCUMENTS

JP  2013-12321 A   1/2013
JP  2013-134856 A  7/2013

* cited by examiner

*Primary Examiner* — Sherman Ng
(74) *Attorney, Agent, or Firm* — Drinker Biddle & Reath LLP (57) ABSTRACT

A superconducting wire includes a main body portion, a substrate, and a cover portion. The main body portion includes a first main surface and a second main surface located opposite to the first main surface, and includes a superconducting material portion. The substrate supports the second main surface of the main body portion. The cover portion is formed at least on the first main surface of the main body portion. In the cover portion, surface roughness in a central portion in a width direction of the superconducting wire is smaller than surface roughness at an end portion in the width direction.

4 Claims, 5 Drawing Sheets

SUPERCONDUCTING WIRE AND SUPERCONDUCTING COIL

TECHNICAL FIELD

The present disclosure relates to a superconducting wire and a superconducting coil.

BACKGROUND ART

An oxide superconducting wire provided with a superconducting material layer composed of an oxide superconductor representing a high-temperature superconductor of which transition temperature is not higher than a temperature of liquid nitrogen has recently attracted attention.

Such an oxide superconducting wire is generally manufactured by forming a main body portion including an oxide superconducting material layer and covering an outer periphery of the main body portion with a cover portion composed of silver (Ag) or copper (Cu) (see, for example, Japanese Patent Laying-Open No. 2013-12321 (PTL 1) and Japanese Patent Laying-Open No. 2013-134856 (PTL 2)).

CITATION LIST

Patent Literature

PTL 1: Japanese Patent Laying-Open No. 2013-12321
PTL 2: Japanese Patent Laying-Open No. 2013-134856

SUMMARY OF INVENTION

A superconducting wire according to the present disclosure includes a main body portion, a substrate, and a cover portion. The main body portion includes a first main surface and a second main surface located opposite to the first main surface and includes a superconducting material portion. The substrate supports the second main surface of the main body portion. The cover portion is formed at least on the first main surface of the main body portion. In the cover portion, surface roughness in a central portion in a width direction of the superconducting wire is smaller than surface roughness at an end portion in the width direction.

DETAILED DESCRIPTION

Problem to be Solved by the Present Disclosure

A conventional superconducting wire makes up a superconducting coil, for example, by being wound like a coil and impregnated with a resin followed by curing. The resin with which the superconducting wire is impregnated is generally higher in heat shrinkage than the superconducting wire. Therefore, when the superconducting coil is used as being cooled to a temperature not higher than a critical temperature, stress may be applied to the superconducting wire due to such a difference in heat shrinkage. In this case, a superconducting material layer of the superconducting wire may be damaged by the stress and consequently superconducting characteristics may deteriorate.

It is an object to provide a superconducting wire and a superconducting coil of which deterioration of superconducting characteristics can be suppressed.

Advantageous Effect of the Present Disclosure

According to the present disclosure, a superconducting wire and a superconducting coil of which deterioration of superconducting characteristics can be suppressed can be provided.

DESCRIPTION OF EMBODIMENT OF THE PRESENT INVENTION

Embodiments of the present invention will initially be listed and described.

(1) A superconducting wire 10 (see FIG. 1) according to one manner of the present invention includes a main body portion 7, a substrate 2, and a cover portion 8. Main body portion 7 includes a first main surface 7a and a second main surface 7b located opposite to first main surface 7a and includes a superconducting material portion 4. Substrate 2 supports second main surface 7b of main body portion 7. Cover portion 8 is formed at least on first main surface 7a of main body portion 7. In cover portion 8, surface roughness in a central portion in a width direction of superconducting wire 10 is smaller than surface roughness at an end portion in the width direction.

In a superconducting coil 20 (see FIG. 3) obtained by winding superconducting wire 10 and impregnating the superconducting wire with a resin 16 followed by curing, adhesiveness between cover portion 8 and resin 16 is dependent on surface roughness of cover portion 8. By setting surface roughness in the central portion in the width direction of cover portion 8 to be smaller than surface roughness at the end portion in the width direction as above, adhesiveness between cover portion 8 and resin 16 in the central portion is lower than adhesiveness between cover portion 8 and resin 16 at the end portion.

By doing so, when stress is applied in a thickness direction of superconducting wire 10 due to a difference in heat shrinkage between superconducting wire 10 and resin 16 in cooling of superconducting coil 20, stress is released as a result of peeling at an interface between cover portion 8 and resin 16 in the central portion. Therefore, stress applied to superconducting wire 10 can be lessened. Consequently, damage to superconducting material layer 4 of superconducting wire 10 can be prevented and hence deterioration of superconducting characteristics can be suppressed.

Some superconducting equipment in which superconducting coil 20 is cooled by a refrigerator is configured to cool the superconducting coil by arranging a cooling plate at each of opposing end portions in an axial direction of the coil and cooling the pair of cooling plates. In the superconducting equipment, a heat transfer path through which heat is transferred from an end portion in the width direction of superconducting wire 10 through resin 16 to the cooling plate is defined. According to superconducting wire 10, peeling at the interface between cover portion 8 and resin 16 at the end portion in the width direction is suppressed even though stress is applied to superconducting wire 10 due to heat shrinkage of resin 16. Therefore, lowering in thermal conductivity between superconducting wire 10 and resin 16 can be prevented. Therefore, superconducting coil 20 can efficiently be cooled.

(2) In superconducting wire 10, surface roughness in the central portion of cover portion 8 may be equal to or smaller than 0.8 µm. Surface roughness at the end portion of cover portion 8 may be greater than 0.8 µm and equal to or smaller than 1.2 µm.

In this case, when stress is applied in the thickness direction of superconducting wire 10 due to shrinkage of resin 16 involved with cooling, peeling is more likely at the interface between cover portion 8 and resin 16 in the central portion of cover portion 8, and this peeling at the interface can bring about release of stress applied to superconducting wire 10. Since peeling at the interface between cover portion 8 and resin 16 is suppressed at the end portion of cover portion 8, lowering in thermal conductivity between superconducting wire 10 and resin 16 can be suppressed.

(3) In superconducting wire 10, cover portion 8 may be formed as a metal layer which covers a periphery of main body portion 7 and substrate 2.

Thus, the metal layer located on first main surface 7a of main body portion 7 is smaller in surface roughness in the central portion in the width direction than at the end portion in the width direction. Therefore, stress applied to the central portion of superconducting wire 10 while superconducting coil 20 is in use is released and damage to superconducting material layer 4 can be prevented. Furthermore, superconducting coil 20 can efficiently be cooled.

(4) Superconducting coil 20 (see FIG. 3) according to one manner of the present invention includes a coil body 12 formed by winding superconducting wire 10 described above and resin 16 with which coil body 12 is impregnated.

By doing so, superconducting coil 20 high in cooling efficiency, of which deterioration of superconducting characteristics due to stress caused by heat shrinkage is less likely when the superconducting coil is used as being cooled to a temperature not higher than a critical temperature of superconducting wire 10, can be realized.

Details of Embodiment of the Present Invention

An embodiment of the present invention will be described below with reference to the drawings. The same or corresponding elements in the drawings below have the same reference characters allotted and description thereof will not be repeated.

Superconducting wire 10 according to the embodiment of the present invention will initially be described with reference to FIG. 1.

Figure 1:
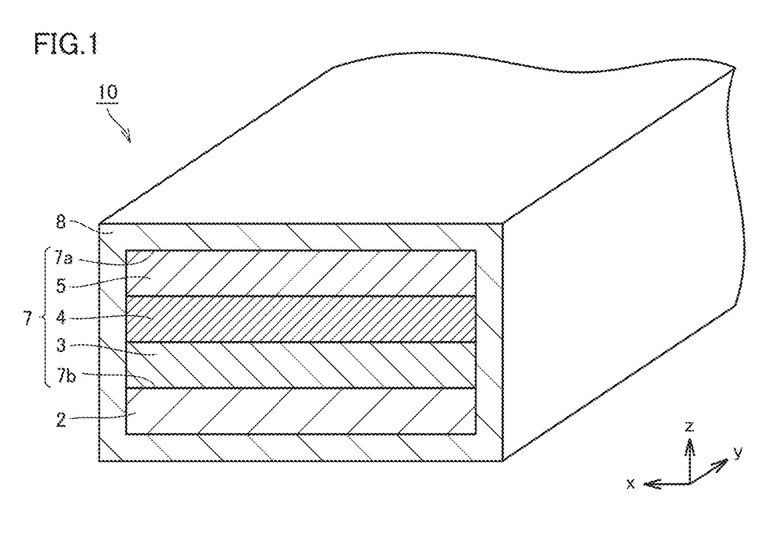
FIG. 1 is a cross-sectional view of a superconducting wire according to the present embodiment.

FIG. 1 shows a cross-section of superconducting wire 10 according to the present embodiment along a direction intersecting a direction of extension of superconducting wire 10 (a longitudinal direction). In superconducting wire 10, a superconducting current flows along the longitudinal direction of superconducting wire 10. As shown in FIG. 1, a width direction, a longitudinal direction, and a thickness direction of superconducting wire 10 are defined as an x-axis direction, a y-axis direction, and a z-axis direction, respectively.

Superconducting wire 10 according to the present embodiment may be in such a shape of a tape that a length in the longitudinal direction is longer than a thickness and a width and the width is greater than the thickness. A surface (an xy plane) which extends in the width direction and the longitudinal direction of superconducting wire 10 is herein called a main surface.

As shown in FIG. 1, superconducting wire 10 mainly includes main body portion 7, substrate 2, and cover portion 8. Main body portion 7 includes first main surface 7a and second main surface 7b opposite to first main surface 7a. Substrate 2 supports second main surface 7b of main body portion 7. Cover portion 8 is formed at least on first main surface 7a of main body portion 7.

Substrate 2 may be made, for example, of a metal and may be in a shape of a tape having a rectangular cross-section. For winding into a shape of a coil, substrate 2 is preferably elongated, for example, to a length of approximately 1 km. A thickness of substrate 2 should only be adjusted as appropriate depending on a purpose, and the thickness can normally be set within a range from 50 µm to 200 µm.

An orientation-aligned metal substrate is preferably employed as substrate 2. The orientation-aligned metal substrate means a substrate in which crystal orientations are aligned in directions of two axes (the x-axis direction and the y-axis direction) in a plane of the substrate surface. For the orientation-aligned metal substrate, for example, an alloy of at least two metals selected from among nickel (Ni), copper (Cu), chromium (Cr), manganese (Mn), cobalt (Co), iron (Fe), palladium (Pd), silver (Ag), and gold (Au) is suitably employed. The orientation-aligned metal substrate may be formed, for example, by bonding an orientation-aligned metal film to a surface of another metal or alloy. For example, SUS which is a high-strength material can be employed as an alloy. Examples of a material for the orientation-aligned metal film include nickel tungsten (NiW) and copper (Cu), however, the material for substrate 2 is not particularly limited thereto. When a non-oriented substrate of which surface is not crystallographically oriented such as an SUS substrate or a Hastelloy substrate is employed as substrate 2, a crystallographically oriented layer formed, for example, by ion beam assisted deposition (IBAD) may be employed as an intermediate layer 3.

Main body portion 7 may include intermediate layer 3, superconducting material layer 4, and a protective layer 5. Main body portion 7 should only include at least superconducting material layer 4.

Intermediate layer 3 may be formed on the main surface of substrate 2. A material which is extremely low in reactivity with superconducting material layer 4 and does not lower superconducting characteristics of superconducting material layer 4 can be employed for intermediate layer 3. A material which prevents metal atoms from flowing out of substrate 2 to superconducting material layer 4 during formation of superconducting material layer 4 through a high-temperature process can be employed for intermediate layer 3. Preferably, intermediate layer 3 is composed, for example, of at least one of yttria-stabilized zirconia (YSZ), cerium oxide ($CeO_2$), magnesium oxide (MgO), yttrium oxide ($Y_2O_3$), aluminum oxide ($Al_2O_3$), lanthanum manganese oxide ($LaMnO_3$), and strontium titanate ($SrTiO_3$).

Intermediate layer 3 may be constituted of a plurality of layers. When intermediate layer 3 is constituted of a plurality of layers, layers which constitute intermediate layer 3 may be composed of materials different from one another or some of the layers may be composed of an identical material.

Superconducting material layer 4 may be formed on a main surface of intermediate layer 3 opposite to its main surface opposed to substrate 2 (an upper main surface in FIG. 1). Superconducting material layer 4 refers to a portion of superconducting wire 10 where a superconducting current flows. Superconducting material layer 4 corresponds to the "superconducting material portion" in the present embodiment. In the present embodiment, superconducting material layer 4 representing the superconducting material portion is made as a thin layer composed substantially of a superconducting material.

A superconducting material which can be employed for superconducting material layer 4 is not particularly limited. An RE-123-based oxide superconductor may be employed as the superconducting material. The RE-123-based oxide superconductor means a superconductor expressed as $REBa_2Cu_3O_y$ (where y is from 6 to 8 and more preferably from 6.8 to 7 and RE represents yttrium or a rare-earth element such as Gd, Sm, or Ho).

In order to improve a critical current Ic, superconducting material layer 4 preferably has a thickness not smaller than 0.5 µm. Though a thickness of superconducting material layer 4 is not particularly limited, it is desirably set to 10 µm or smaller in consideration of productivity.

Protective layer 5 may be formed on a main surface of superconducting material layer 4 opposite to its main surface opposed to intermediate layer 3 (an upper main surface in FIG. 1). Protective layer 5 has a function to protect superconducting material layer 4. Protective layer 5 is composed, for example, of silver (Ag) or an silver alloy. Protective layer 5 has a thickness preferably not greater than 2 µm and more preferably not smaller than 0.05 µm and not greater than 2 µm.

Cover portion 8 should only cover at least first main surface 7a of main body portion 7. In the present embodiment, cover portion 8 is provided to cover the entire periphery of main body portion 7 and substrate 2.

Cover portion 8 is formed from a metal layer such as a foil or a plating layer composed of a highly conductive metal material. Cover portion 8 functions, together with protective layer 5, as a bypass for commutation of a current in superconducting material layer 4 in transition of superconducting material layer 4 from a superconducting state to a normally conducting state. Cover portion 8 further functions to protect main body portion 7 against external force or moisture. In order for cover portion 8 to physically protect protective layer 5 and superconducting material layer 4, cover portion 8 has a thickness preferably not smaller than 10 µm and not greater than 500 µm.

A material which can be formed into a thin foil or a material which can provide plating should only be employed as a material for cover portion 8, and it is not particularly limited. Copper (Cu), an Ni—Cr alloy (NiCr), stainless steel, or a copper alloy such as a Cu—Ni alloy is preferred. When superconducting wire 10 is used for a superconducting fault current limiter, cover portion 8 is preferably composed of a metal material high in resistance, and preferably composed, for example, of an Ni-based alloy such as NiCr.

A method of manufacturing superconducting wire 10 according to the present embodiment will now be described.

A step of preparing substrate 2 is initially performed. Specifically, substrate 2 formed from an orientation-aligned metal substrate is preferably prepared.

Then, a step of forming intermediate layer 3 on substrate 2 is performed. Specifically, intermediate layer 3 is formed on a main surface of substrate 2. For example, physical vapor deposition such as sputtering can be employed as a method of forming intermediate layer 3. When a surface of substrate 2 is not crystallographically oriented, orientation-aligned intermediate layer 3 may be formed by IBAD.

A step of forming superconducting material layer 4 on intermediate layer 3 is then performed. In the present embodiment, superconducting material layer 4 containing an RE-123-based oxide superconductor is formed on a surface of intermediate layer 3 opposite to its main surface opposed to substrate 2 (the upper main surface of intermediate layer 3 in FIG. 1). For example, superconducting material layer 4 as a thin layer may be formed, for example, by vapor phase deposition and liquid phase deposition or combination thereof. Examples of vapor phase deposition include pulsed laser deposition (PLD), sputtering, electron beam vapor deposition, metal organic chemical vapor deposition (MOCVD), and molecular beam epitaxy (MBE). By forming superconducting material layer 4 by at least one of these deposition methods, superconducting material layer 4 with a surface excellent in crystal orientation and surface smoothness can be formed.

A step of forming protective layer 5 on superconducting material layer 4 is then performed. Specifically, protective layer 5 composed of silver (Ag) or a silver alloy is formed on a main surface of superconducting material layer 4 opposite to its main surface opposed to intermediate layer 3 (the upper main surface of superconducting material layer 4 in FIG. 1). Protective layer 5 may be formed, for example, by physical vapor deposition such as sputtering.

A step of annealing main body portion 7 in an oxygen atmosphere is then performed. Oxygen is introduced into superconducting material layer 4 in this annealing step. By performing the steps above, main body portion 7 including intermediate layer 3, superconducting material layer 4, and protective layer 5 is formed on substrate 2.

A step of forming cover portion 8 to cover main body portion 7 and substrate 2 is finally performed. Cover portion 8 should only cover at least first main surface 7a of main body portion 7. In the present embodiment, cover portion 8 is provided to cover the entire periphery of main body portion 7 and substrate 2. Cover portion 8 may be formed on main body portion 7 and substrate 2, for example, by plating or a foil bonding method.

In order to adjust a width of a wire, a step of cutting main body portion 7 and substrate 2 into small-width sections may be performed between the step of forming protective layer 5 and the step of forming cover portion 8. In the step of cutting main body portion 7 and substrate 2 into small-width sections, a set of main body portion 7 and substrate 2 is subjected, for example, to machine slitting or laser slitting to thereby cut the set of main body portion 7 and substrate 2 into small-width sections each having a prescribed width. For example, by cutting a set of main body portion 7 and substrate 2 having a width of 30 mm into small-width sections each having a width of 4 mm, seven sets of small-width main body portion 7 and substrate 2 can be obtained from one set of main body portion 7 and substrate 2.

Alternatively, in the step of preparing substrate 2, a step of cutting substrate 2 into small-width sections may be performed. For example, substrate 2 having a width of 30 mm is cut into small-width sections each having a width of 4 mm. Main body portion 7 as a small-width section can be obtained by successively forming intermediate layer 3, superconducting material layer 4, and protective layer 5 on substrate 2 cut into a small-width section.

Superconducting wire 10 shown in FIG. 1 is manufactured by performing the steps above.

An example of superconducting coil 20 including superconducting wire 10 according to the present embodiment will now be described with reference to FIGS. 2 and 3.

Figure 2:
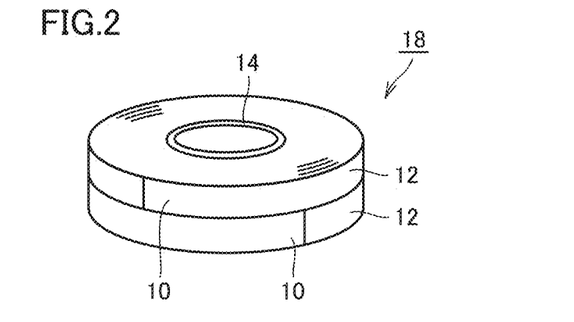
FIG. 2 is a perspective view showing a coil body including the superconducting wire according to the present embodiment.

FIG. 2 is a perspective view showing coil body 12 including superconducting wire 10 according to the embodiment. Superconducting wire 10 is shaped like a coil generally by being wound like a single pancake or a double pancake around a frame 14.

FIG. 2 shows a double pancake coil 18 by way of example. Double pancake coil 18 includes two coil bodies 12 stacked on each other.

In double pancake coil 18, a direction of winding of superconducting wire 10 in one coil body 12 and a direction of winding in the other coil body 12 are reverse to each other. End portions located on an inner circumferential side of superconducting wires 10 in two coil bodies 12 are electrically connected to each other through a not-shown connection portion. Two coil bodies 12 are thus connected in series to each other between an end portion located on an outer circumferential side of one coil body 12 and an end portion located on an outer circumferential side of the other coil body 12.

In the present embodiment, coil body 12 is wound with a side thereof where main body portion 7 of superconducting wire 10 is formed being defined as an inner side and a side thereof on a side of substrate 2 being defined as an outer side.

Superconducting coil 20 is formed by covering the entire double pancake coil 18 shown in FIG. 2 with resin 16. FIG. 3 is a perspective view of superconducting coil 20 constructed by covering double pancake coil 18 shown in FIG. 2 with resin 16.

Figure 3:
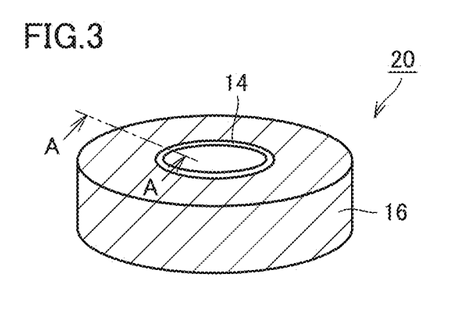
FIG. 3 is a perspective view of a superconducting coil including the superconducting wire according to the present embodiment.

As shown in FIG. 3, by impregnating double pancake coil 18 with resin 16 and curing the resin, the entire double pancake coil 18 is integrally covered with resin 16. Relative positional relation between superconducting wires 10 can thus be maintained also against electromagnetic force, and stable magnetic field can be formed.

For example, a thermosetting resin such as an epoxy resin, a phenol resin, a urea resin, and a melamine resin can be employed as resin 16. Resin 16 can permeate into every part of double pancake coil 18 by using, for example, a vacuum impregnation method. Mechanical strength of double pancake coil 18 can thus be improved.

Figure 4:
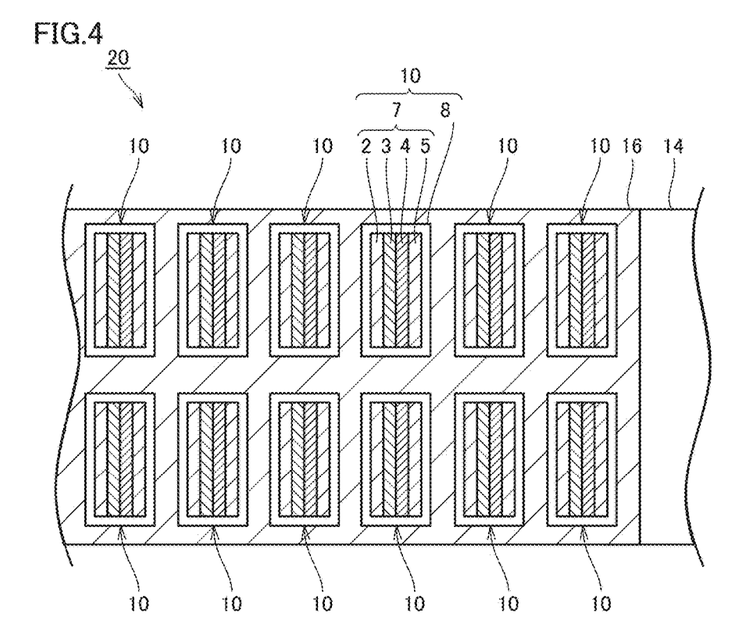
FIG. 4 is a cross-sectional view along the line A-A shown in FIG. 3.

FIG. 4 is a cross-sectional view along the line A-A shown in FIG. 3. As shown in FIG. 4, a space between superconducting wires 10 is also filled with resin 16 by impregnation with resin 16 to cover superconducting wire 10.

Superconducting equipment in which superconducting coil 20 is cooled by a refrigerator is configured to cool superconducting coil 20 by arranging a cooling plate (not shown) at each of opposing end portions in the axial direction of superconducting coil 20 and cooling the cooling plates. In such superconducting equipment, a heat transfer path through which heat is mainly transferred from the end portion in the width direction of superconducting wire 10 through resin 16 to the cooling plates is defined between superconducting wire 10 and the cooling plates.

Functions and effects of the present embodiment will be described below.

In superconducting wire 10 according to the present embodiment, in cover portion 8 located on first main surface 7a of main body portion 7, surface roughness in the central portion in the width direction (x-axis direction) is smaller than surface roughness at the end portion in the width direction.

Figure 5:
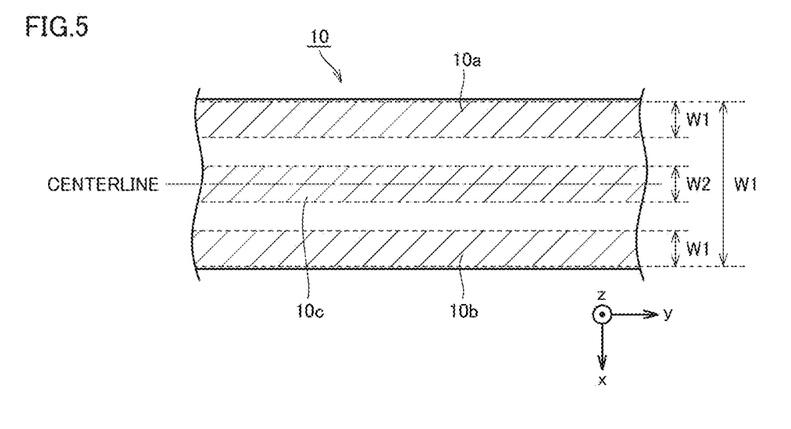
FIG. 5 is an enlarged view of a cover portion which is a part of the superconducting wire according to the present embodiment.

FIG. 5 is an enlarged view of cover portion 8 which is a part of superconducting wire 10 according to the present embodiment. FIG. 5 shows a part of cover portion 8 located on first main surface 7a of main body portion 7.

As shown in FIG. 5, in cover portion 8, an end portion 10a is located at one end in the width direction (x-axis direction) and an end portion 10b is located at the other end in the width direction. In cover portion 8, a central portion 10c is located to include a centerline in the width direction.

A ratio (W1/W) of a width W1 to a width W is preferably not lower than 10% and not higher than 30%, with W representing a width of superconducting wire 10, W1 representing a width of each of end portions 10a and 10b, and W2 representing a width of central portion 10c. A ratio of width W2 to width W is preferably not lower than 40% and not higher than 80%.

Surface roughness at each of end portions 10a and 10b and central portion 10c can be found by determining a surface profile of a main surface of cover portion 8. In the present embodiment, a surface profile was determined by using a stylus surface profiler (apparatus name: DEKTAK 3030 manufactured by Bruker Nano).

In determining a surface profile, a surface of cover portion 8 corresponding to each of end portions 10a and 10b and central portion 10c was scanned by the stylus profiler within a range of 500 μm. A curve obtained in this determination represents a profile curve of the surface of cover portion 8. Only a reference length (for example, 50 μm) was extracted from the obtained profile curve and a sum (a maximum height) of the largest depth of a valley and the largest height of a hill in this extracted portion was calculated.

Table 1 shows results of measurement of surface roughness for each of superconducting wires 10 according to Examples 1 to 4. Superconducting wire 10 according to each of Examples 1 to 4 was manufactured by the manufacturing method described above and included a superconducting wire structure shown in FIG. 1. A value calculated by averaging a measurement value of surface roughness at end portion 10a and a measurement value of surface roughness at end portion 10b was adopted as surface roughness at the end portion.

TABLE 1

|  | Central Portion | End Portion |
|---|---|---|
| Example 1 | 0.6 μm | 0.8 μm |
| Example 2 | 0.6 μm | 0.9 μm |
| Example 3 | 0.8 μm | 0.8 μm |
| Example 4 | 0.8 μm | 1.2 μm |

As shown in Table 1, in each of Examples 1, 2, and 4, surface roughness in the central portion is smaller than surface roughness at the end portion. In Example 3, the central portion and the end portion are equal to each other in surface roughness.

In superconducting wire 10 according to the present embodiment, surface roughness in central portion 10c of cover portion 8 can preferably be not greater than 0.8 μm and more preferably not greater than 0.6 μm. Surface roughness at end portions 10a and 10b of cover portion 8 can be preferably greater than 0.8 μm and more preferably not greater than 1.2 μm.

Surface roughness in central portion 10c smaller than surface roughness at end portions 10a and 10b in cover portion 8 can be realized in an example in which cover portion 8 is formed from a plating layer, by controlling a surface profile of the main surface of cover portion 8 by using an additive contained in a plating liquid in the step of forming cover portion 8. In an example in which cover portion 8 is formed from a metal foil, such a feature can be realized by treating a surface of the metal foil in the step of forming cover portion 8 from the metal foil.

According to the present embodiment, deterioration of superconducting characteristics of superconducting coil 20 (see FIG. 3) made of superconducting wire 10 can be suppressed. Reasons therefor will be described below.

In general, a resin for impregnation is higher in heat shrinkage than a superconducting wire. Therefore, when a superconducting coil is used as being cooled to a temperature not higher than a critical temperature, stress may be applied to the superconducting wire due to such a difference in heat shrinkage. This stress is applied totally in the thickness direction of the superconducting wire. Namely, stress is applied to the main surface of the superconducting wire. When the superconducting wire receives the stress, local damage or deformation is likely in the superconducting material layer of the superconducting wire. Consequently, superconducting characteristics of the superconducting coil may deteriorate.

In superconducting coil 20 according to the present embodiment, stress resulting from a difference in heat shrinkage between superconducting wire 10 and resin 16 is mainly applied to cover portion 8 located outermost in superconducting wire 10.

In superconducting coil 20, adhesiveness between cover portion 8 and resin 16 is dependent on surface roughness of cover portion 8. Specifically, as the surface of cover portion 8 is rougher, introduction of resin 16 into small projections and recesses provided in the surface of cover portion 8 is more likely and hence adhesiveness is enhanced.

As set forth above, in cover portion 8 located on first main surface 7a of main body portion 7, surface roughness in central portion 10c in the width direction is smaller than surface roughness at end portions 10a and 10b in the width direction. Therefore, adhesiveness between cover portion 8 and resin 16 in central portion 10c is lower than adhesiveness between cover portion 8 and resin 16 at end portions 10a and 10b.

When stress is thus applied in the thickness direction of superconducting wire 10 due to shrinkage of resin 16 involved with cooling, peeling at the interface between cover portion 8 and resin 16 is likely in central portion 10c. Stress applied to superconducting wire 10 is released by peeling at the interface, and consequently stress applied to superconducting wire 10 can be lessened. Since damage and deformation of superconducting material layer 4 can thus be suppressed, deterioration of superconducting characteristics can be suppressed.

When peeling occurs at the interface between cover portion 8 and resin 16, a gap is produced at the interface. Therefore, thermal conductivity between superconducting wire 10 and resin 16 may lower. Consequently, in superconducting equipment configured to cool superconducting coil 20 with a refrigerator, heat transferability from superconducting wire 10 through resin 16 to the cooling plates may lower and consequently efficiency in cooling superconducting coil 20 may lower.

In superconducting wire 10 according to the present embodiment, adhesiveness between cover portion 8 and resin 16 is high at end portions 10a and 10b. Therefore, even though stress may be applied due to heat shrinkage of resin 16, peeling at the interface between cover portion 8 and resin 16 at end portions 10a and 10b can be suppressed. Since adhesion between superconducting wire 10 and resin 16 is kept, lowering in thermal conductivity can be suppressed. Therefore, superconducting coil 20 can efficiently be cooled.

As surface roughness at end portions 10a and 10b is greater, adhesiveness between cover portion 8 and resin 16 tends to be higher. When surface roughness at end portions 10a and 10b is larger, however, electric field tends to concentrate in the vicinity of end portions 10a and 10b while superconducting coil 20 is in use. When an overvoltage is thus generated in superconducting coil 20, dielectric breakdown may occur between turns of a winding of coil body 12. In order to ensure dielectric strength of superconducting coil 20, surface roughness at end portions 10a and 10b is preferably not greater than 1.2 µm.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST

2 substrate; 3 intermediate layer; 4 superconducting material layer; 5 protective layer; 7 main body portion; 7a first main surface; 7b second main surface; 8 cover portion; 10 superconducting wire; 10a, 10b end portion; 10c central portion; 12 coil body; 16 resin; 18 double pancake coil; and 20 superconducting coil

The invention claimed is:

1. A superconducting wire comprising:
   a main body portion including a first main surface and a second main surface located opposite to the first main surface, the main body portion including a superconducting material portion;
   a substrate which supports the second main surface of the main body portion; and
   a cover portion formed at least on the first main surface of the main body portion,
   in the cover portion, surface roughness in a central portion in a width direction of the superconducting wire being smaller than surface roughness at an end portion in the width direction.

2. The superconducting wire according to claim 1, wherein
   the surface roughness in the central portion of the cover portion is equal to or smaller than 0.8 µm, and
   the surface roughness at the end portion of the cover portion is greater than 0.8 µm and equal to or smaller than 1.2 µm.

3. The superconducting wire according to claim 1, wherein
   the cover portion is formed as a metal layer which covers a periphery of the main body portion and the substrate.

4. A superconducting coil comprising:
   a coil body formed by winding the superconducting wire according to claim 1; and
   a resin with which the coil body is impregnated.

* * * * *